(12) United States Patent
Purdy et al.

(10) Patent No.: US 12,084,364 B2
(45) Date of Patent: Sep. 10, 2024

(54) MODIFIED SULFURIC ACID AND USES THEREOF

(71) Applicant: Chemical Evolution Ltd., Calgary (CA)

(72) Inventors: Clay Purdy, Medicine Hat (CA); Markus Weissenberger, Calgary (CA); Markus Pagels, Calgary (CA); Kyle G Wynnyk, Calgary (CA); Karl W Dawson, Calgary (CA)

(73) Assignee: Chemical Evolution Ltd., Calgary (CA)

( * ) Notice: Subject to any disclaimer, the term of this patent is extended or adjusted under 35 U.S.C. 154(b) by 108 days.

(21) Appl. No.: 17/404,131

(22) Filed: Aug. 17, 2021

(65) Prior Publication Data

US 2022/0267178 A1 Aug. 25, 2022

(30) Foreign Application Priority Data

Feb. 25, 2021 (CA) .................................. CA 3110391

(51) Int. Cl.
  *C02F 1/72* (2023.01)
  *C02F 101/18* (2006.01)
  *C02F 103/10* (2006.01)

(52) U.S. Cl.
  CPC .......... *C02F 1/722* (2013.01); *C02F 2101/18* (2013.01); *C02F 2103/10* (2013.01)

(58) Field of Classification Search
  CPC .... C02F 1/72; C02F 2101/16; C02F 2101/18; C02F 2101/163; C02F 2101/166; C02F 2103/10; C02F 2103/12; C02F 1/722
  See application file for complete search history.

(56) References Cited

U.S. PATENT DOCUMENTS

| 3,801,512 A | | 4/1974 | Solenberger | |
| 3,984,314 A | * | 10/1976 | Fries | B01J 41/05 |
| | | | | 423/24 |
| 4,732,609 A | * | 3/1988 | Frey | C22B 3/42 |
| | | | | 423/100 |

FOREIGN PATENT DOCUMENTS

| AU | 7814998 A | * | 12/1998 | | |
| CN | 103572306 A | | 2/2014 | | |
| CN | 103820796 A | | 5/2014 | | |
| CN | 108862714 A | * | 11/2018 | ............... | C02F 9/00 |
| DE | 4437278 A1 | * | 4/1995 | ............... | C02F 1/722 |
| EP | 2431500 A1 | * | 3/2012 | ............... | C25D 21/06 |
| WO | 96-12673 A1 | | 5/1996 | | |

OTHER PUBLICATIONS

English Machine Translation of CN 108862714 A; Cao et al., 6 pages. (Year: 2018).*

(Continued)

*Primary Examiner* — Benjamin L Lebron
(74) *Attorney, Agent, or Firm* — Blank Rome LLP

(57) ABSTRACT

A modified aqueous acid composition comprising: sulfuric acid; a compound comprising an amine moiety and a sulfonic acid moiety; and a peroxide; wherein sulfuric acid, said compound comprising an amine moiety and a sulfonic acid moiety and said peroxide are present in a molar ratio of no less than 1:1:1. Also disclosed are methods of using such compositions for the decomposition of toxic chemicals such as cyanides.

8 Claims, 2 Drawing Sheets

Exposure Time *t* = 75 min

(56) References Cited

OTHER PUBLICATIONS

English Machine Translation of EP 2431500 A1; Jordan et al., 8 pages. (Year: 2012).*
English Machine Translation of DE-4437278-A1; Braden et al., 11 pages. (Year: 1995).*
PCT/CA2021/000066 International Search Report and Written Opinion dated Nov. 3, 2021.
SGS Minerals Services-T3 SGS 018, "Cyanide Destruction", May 2005, [online] [retrieved on Sep. 23, 2021], <https://www.sgs.pt/~/media/Global/Docllllents/Flyers%20and%20Leaflets/SGS-MINWA017-Cyanide-Destruction-EN-11.pdf>.

\* cited by examiner

Before Exposure

Exposure Time $t$ = 0 min

Exposure Time $t$ = 4 min

Exposure Time $t$ = 6 min

Exposure Time $t$ = 10 min

Exposure Time $t$ = 15 min

Exposure Time $t$ = 30 min

Exposure Time $t$ = 45 min

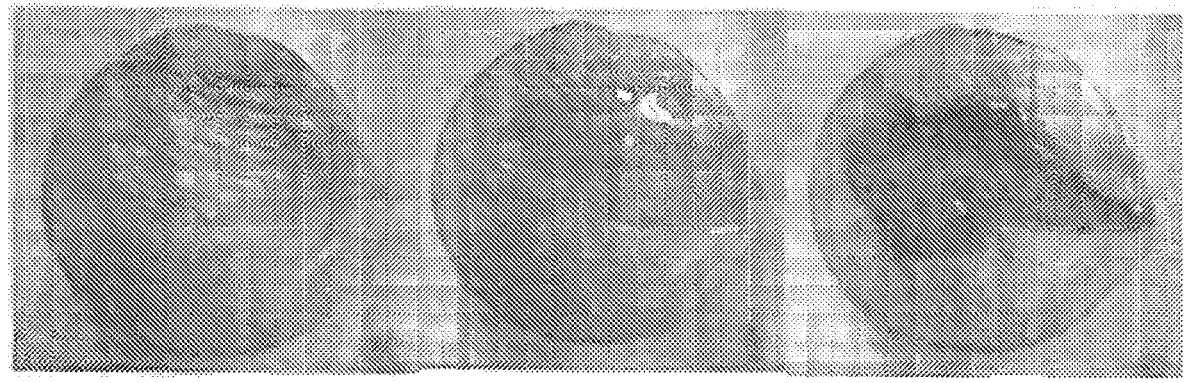
Before Exposure
FIG. 2A
Exposure Time $t$ = 0 min
FIG. 2B
Exposure Time $t$ = 5 min
FIG. 2C
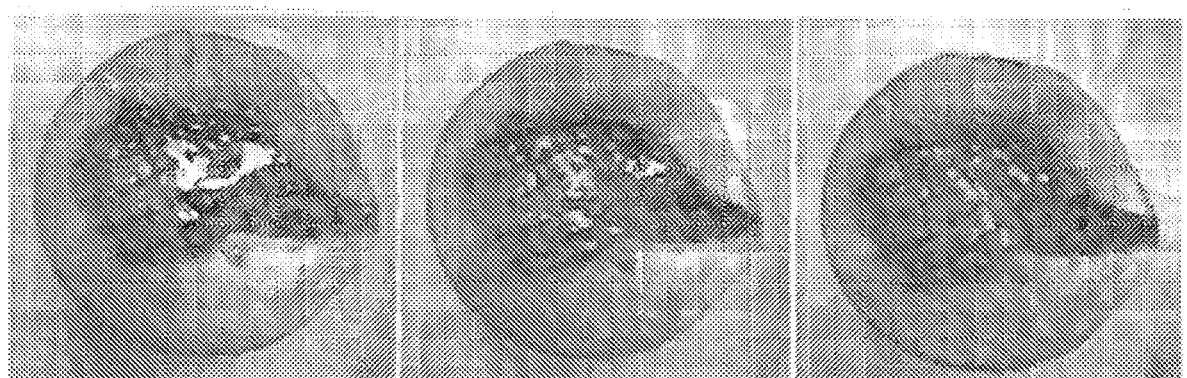
Exposure Time $t$ = 10 min
FIG. 2D
Exposure Time $t$ = 15 min
FIG. 2E
Exposure Time $t$ = 30 min
FIG. 2F
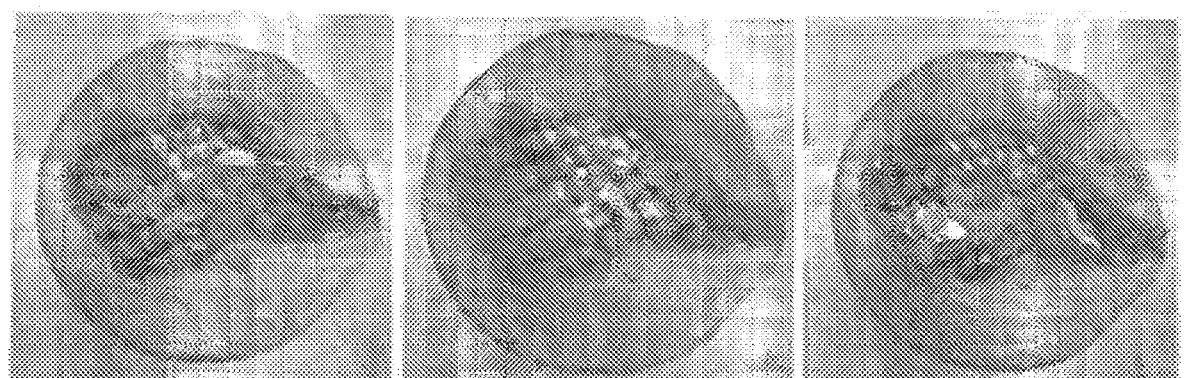
Exposure Time $t$ = 45 min
FIG. 2G
Exposure Time $t$ = 60 min
FIG. 2H
Exposure Time $t$ = 75 min
FIG. 2I

MODIFIED SULFURIC ACID AND USES THEREOF

FIELD OF THE INVENTION

The present invention is directed to a method and composition useful in decomposing reaction material by oxidation, more specifically, to a method and composition for decomposing toxic chemicals such as cyanide, used in the mining industry.

BACKGROUND OF THE INVENTION

In the mining industry, cyanide is primarily used for extracting silver and gold from ores, but cyanide is also used in low concentrations as a flotation reagent for the recovery of base metals such as copper, lead and zinc.

Sodium cyanide solutions are commonly used to leach gold from ore. There are two types of leaching: heap leaching; and vat leaching. Heap leaching is carried out in the open, cyanide solution is sprayed over huge heaps of crushed ore spread atop giant collection pads. The cyanide dissolves the gold from the ore into the solution as it trickles through the heap. The pad collects the now metal-containing solution which is stripped of gold and resprayed on the heap until the ore is depleted. Meanwhile, vat (or tank) leaching is performed by mixing the ore with cyanide solutions in large tanks. While the chances of cyanide spills are lower because the leaching process is carried out with more control, the tailings are stored behind large dams (tailings impoundments) which can fail and have done so with grave consequences on the environment.

Because cyanide leaching is very efficient, it allows profitable mining of much lower ore grades. Mining lower grade ore requires the extraction and processing of much more ore to get the same amount of gold. Partially due to cyanide, modern mines are much larger than before cyanide was used; create vast open pits; and produce huge quantities of waste. It is noteworthy to point out that up to 20 tons of mine waste can be generated to produce enough gold for a typical ring.

Cyanide is a rapid acting, potentially deadly chemical. A "cyanide" is a (metal) salt containing the $CN^-$ anion. The term 'cyanide' refers to one of three classifications of cyanide, and it is critical to define the class of cyanide that is to be removed in a treatment plant. The three classes of cyanide are: (1) total cyanide; (2) weak acid dissociable (WAD) cyanide; and (3) free cyanide. Cyanide easily combines with many metals—making it useful in separating metals like gold from their ore. However, because cyanide is also quite toxic, it can result in substantial environmental impacts and public health risks if released into the environment.

Cyanide spills can persist in the environment and the its degradation can still be harmful. Cyanide spills into groundwater can persist for long periods of time and contaminate drinking water aquifers. Cyanide contaminated groundwater can also pollute hydrologically connected neighboring streams. An example of this is at the Beal Mountain Mine in Montana which closed in 1998. Cyanide present on site seeped into groundwater that feeds neighboring trout streams, resulting in cyanide contaminations in those streams long-after the mine had closed.

Cyanide spills have also resulted in major fish kills, contaminated drinking water supplies and harmed agricultural lands, such environmental disaster occurred in 2014 in Mexico, in 1998 in Kyrgyzstan, in 2000 in Romania, and in 1982 in the United States. While seemingly anecdotal, each one of those disasters were devastating to their communities.

An integral and key component of many water management systems at mining sites is the approach adopted to manage cyanide-containing solutions and slurries. Excluding the bulk storage of cyanide reagents such as sodium cyanide, most cyanide present at mining sites will be present in water solutions. Therefore, to a great extent the management of water and the management of cyanide can be considered as one and the same and should be simultaneously considered when developing water management and cyanide management plans.

All mining sites that utilize cyanide for metals recovery should have a comprehensive and well-maintained cyanide management plan. A good cyanide management plan will include descriptions of how cyanide-containing solutions and slurries are to be handled, stored, contained and monitored, and in many cases the plan will also include a description of treatment plants used to remove cyanide from solutions or slurries.

At these operations, cyanide treatment systems may be required to address potential toxicity issues in regard to wildlife, water flow and/or aquatic life. This may include the removal of cyanide from one or more of the following: slurry tailings from milling operations; excess solution from heap or vat leaching operations; supernatant solution from tailings impoundments; and seepage collected from ponds or tailings impoundments.

The appropriate selection for most situations is WAD cyanide since this includes the toxicologically important forms of cyanide, including free cyanide and moderately and weakly complexed metal-cyanides. Total cyanide includes free cyanide, WAD cyanide plus the relatively non-toxic iron-cyanide complexes. Cyanide treatment processes are classified as either a destruction-based process or a recovery-based process. In a destruction process, either chemical or biological reactions are utilized to convert cyanide into another less toxic compound. Recovery processes are a recycling approach in which cyanide is removed from the solution or slurry and then re-used in a metallurgical circuit.

Most cyanide destruction processes operate on the principle of converting cyanide into a less toxic compound through an oxidation reaction. There are several destruction processes that are well proven to produce treated solutions or slurries with low levels of cyanide as well as metals.

The following methods are some of the most commonly used for cyanide destruction across the world: alkaline chlorination; hydrogen peroxide; $SO_2$/Air; iron cyanide precipitation; ozonation; and Caro's acid. Each one having advantages and drawbacks, but each one trying to best achieve cost effectiveness of cyanide destruction all the while respecting the environmental regulations in various jurisdictions. The cost of treating cyanide tailings can be a significant percentage of total operating costs, and unlike other operating costs, yields no economic "return". It is therefore very important, for both regulatory and economic reasons, to select the correct process, and then optimize the operating conditions to minimize reagent dosages.

Alkaline Chlorination

Alkaline chlorination at one time was the most widely applied of the cyanide treatment processes, but it has gradually been replaced by other processes and is now only used occasionally. Alkaline chlorination is effective at treating cyanide to low levels, but the process can be relatively expensive to operate due to high reagent usages. The cyanide destruction reaction is two-step, the first step in which cyanide is converted to cyanogen chloride (CNCl) as per the following formula:

$$Cl_2 + CN^- \rightarrow CNCl + Cl^-$$

and the second step in which cyanogen chloride hydrolyzes to yield cyanate:

$$CNCl + H_2O \rightarrow OCN^- + Cl^- + 2H^+$$

In the presence of a slight excess of chlorine, cyanate is further hydrolyzed to yield ammonia in a catalytic type of reaction.

$$OCN^- + 3H_2O \rightarrow NH_4^+ + HCO_3^- + OH^-$$

If sufficient excess chlorine is available, the reaction continues through 'breakpoint chlorination' in which ammonia is fully oxidized to nitrogen gas ($N_2$) as per the following formula:

$$3Cl_2 + 2NH_4^+ \rightarrow N_2 + 6Cl^- + 8H^+$$

In addition to reacting with cyanide, cyanate and ammonia, the alkaline chlorination process will oxidize thiocyanate, which in some cases can lead to excessively high consumptions of chlorine as per the following formula:

$$4Cl_2 + SCN^- + 5H_2O \rightarrow SO_4^{-2} + OCN^- + 8Cl^- + 10H^+$$

The primary application of the alkaline chlorination process is with solutions rather than slurries due to the high consumption of chlorine in slurry applications. The process is typically applied to treat low solutions flows initially containing low to high levels of cyanide to achieve cyanide levels that may be suitable for discharge. The process is effective for the treatment of solutions for the oxidation of free and WAD cyanides, but a lesser amounts of iron cyanides are removed depending on the levels of other base metals in the solution being treated. As can be seen in the above reactions, a significant increase in the treated water dissolved solids concentration may result, particularly with chloride. The theoretical usage of $Cl_2$ to oxidize cyanide to cyanate is 2.73 grams $Cl_2$ per gram of $CN^-$ oxidized, but in practice the actual usage ranges from about 3.0 to 8.0 grams $Cl_2$ per gram of $CN^-$ oxidized. The $Cl_2$ used in the process can be provided as an aqueous solution of $Cl_2$ or as a 12.5% solution of sodium hypochlorite (NaOCl). Chlorine consumptions for the oxidation of ammonia and thiocyanate can be calculated from the above reactions, which may significantly add to chlorine required in the process. In addition, the above reactions generate varying amounts of acid (H) which is typically neutralized by adding lime or sodium hydroxide to the reaction vessels. The reaction is advantageously carried out at a pH of greater than 10.0 to ensure cyanogen chloride is completely hydrolyzed to cyanate. An advantage of the process is that copper is not required as a catalyst as with the sulfur dioxide/air and hydrogen peroxide processes. Upon completion of the cyanide oxidation reaction, metals previously complexed with cyanide, such as copper, nickel and zinc, are precipitated as metal-hydroxide compounds.

This process is understood to be capable of achieving low levels of both cyanide and metals. The best application of this process is with low flows of solutions containing high to low initial levels of cyanide when treated cyanide levels of less than about 1 mg/L are required.

Iron-Cyanide Precipitation

Free, WAD and total cyanides will all react with ferrous iron to yield a variety of soluble and insoluble compounds, primarily hexacyanoferrate (III) ($Fe(CN)_6^{-3}$), Prussian blue ($Fe_4[Fe(CN)_6]^3$) and other insoluble metal-iron-cyanide ($M_xFe_y(CN)_6$) compounds such as those with copper or zinc (Adams, 1992).

$$Fe^{+2} + 6CN^- + \tfrac{1}{4}O_2 + H^+ \rightarrow Fe(CN)_6^{-3} + \tfrac{1}{2}H_2O$$

$$4Fe^{+2} + 3Fe(CN)_6^{-3} + \tfrac{1}{4}O_2 + H^+ \rightarrow Fe_4[Fe(CN)_6]_3 + \tfrac{1}{2}H_2O$$

One of the disadvantages of the process using iron-cyanide precipitation is its limited suitability to situations where the precipitation reactions can be controlled and the precipitated solids can be separated and properly disposed. In the past, this process was widely used to convert free and WAD cyanides to less toxic iron-cyanide compounds, but its present utility is primarily as a polishing process to reduce total cyanide concentrations to less than about 1 to 5 mg/L. Moreover, the process is best carried out at a pH of about 5.0 to 6.0 and iron is added as ferrous sulfate ($FeSO_4 \cdot 7H_2O$) maintaining pH in such a narrow window can prove to be difficult for an operator. Ferrous sulfate usage ranges from about 0.5 to 5.0 moles Fe per mole of $CN^-$ depending on the desired level of treatment.

Ozonation

Some of the advantages associated with the ozonation process of cyanide destruction include: fast kinetics since ozone is a strong oxidant; it does not require copper catalyst; it can oxidize thiocyanates; it can oxidize weak acid dissociable $CN^-$ efficiently. However, some of the disadvantages of using ozonation to process undesirable cyanide compounds include: non selectivity leading to high reagent requirement; may react with the solid phase and release undesirable species such as arsenic into solution; high reagent cost; can release toxic ozone gas, requiring scrubbing; requires ozone resistant equipment; may need to add copper, iron or zinc salts to precipitate iron cyanide; has a tendency to leave some residual copper in solution; the cyanate hydrolyzed converts to undesirable ammonia; ferrocyanide is not destroyed, but may precipitate as a base metal iron cyanide complex. The precipitate can re-dissolve at basic pH (pH>9) and release ferrocyanide back into solution.

Hydrogen Peroxide

Some of the advantages associated with the hydrogen peroxide process for cyanide destruction include: relatively simple to operate; no production of toxic gases; more selective toward weak acid dissociable $CN^-$ than chlorination; and the process uses cost-effective ferrous sulfate in the process. However, some of the disadvantages of using hydrogen peroxide to process undesirable cyanide compounds include: high reagent consumption; requires copper in solution as a catalyst. Tends to leave some residual copper in solution; cyanate hydrolyzes to ammonia; and ferrocyanide is not destroyed, but precipitates as a base metal ferrocyanide complex Sulfur Dioxide Some of the advantages associated with the use of $SO_2$ in cyanide destruction include: low reagent cost; efficient oxidation of weak acid dissociable $CN^-$; sulfite salts may be used in the process; allows for the use of zinc sulfate. However, the disadvantages of using the $SO_2$ process include: it is a relatively difficult system to operate; requires copper in solution as a catalyst; tendency of leaving residual copper in solution; requires vigorous mixing and longer retention time; the cyanates hydrolyze to ammonia; ferrocyanide is not destroyed, but precipitates as a base metal ferrocyanide complex; and copper may re-dissolve in high chloride environment.

Caro's Acid

Caro's acid, also known as peroxymonosulfuric acid ($H_2SO_5$), is one of the strongest oxidants known and is highly explosive. There are several known reactions for the preparation of Caro's acid but one of the most straightforward involves the reaction between sulfuric acid ($H_2SO_4$) and hydrogen peroxide ($H_2O_2$). Preparing Caro's acid in this method allows one to prepare in a further reaction potassium monopersulfate (PMPS) which is a valuable bleaching agent and oxidizer. While Caro's acid has several known useful applications, one noteworthy use is in the destruction of cyanide compounds involved in mining operations.

Conventionally, the formation of Caro's acid is instantaneous and is exothermic, primarily due to the heat of dilution of sulfuric acid. Because of its tendency to decompose to oxygen and sulfuric acid, Caro's acid is not stored, but is used immediately at the site where it is mixed and prepared. For the destruction of cyanide compounds, Caro's acid reacts with the $CN^-$ within one to two minutes according to the formula: $H_2SO_5+CN^- \rightarrow H_2SO_4+CNO^-$. Caro's acid used in the process must be produced on-site using sulfuric acid and hydrogen peroxide since Caro's acid decomposes rather quickly. Caro's acid is used in slurry treatment applications where the addition of a copper catalyst is not desirable, which is typically only in situations where the sulfur dioxide and air process is not suited. The theoretical usage of $H_2SO_5$ in the process is 4.39 grams $H_2SO_5$ per gram of cyanide oxidized, but in practice 5.0 to 15.0 grams $H_2SO_5$ per gram of cyanide oxidized is required. Acid produced in the reaction (Hz) is typically neutralized with lime.

Some of the advantages associated with the use of Caro's acid in cyanide destruction include: fast kinetics as a result of it being a strong oxidant; no need for a copper catalyst; no generation of toxic gas; can oxidize part of the thiocyanate; can remove ferrocyanide as a base metal iron cyanide precipitate; and can oxidize weak acid dissociable $CN^-$ efficiently. Some of the disadvantages of using Caro's acid to process undesirable cyanide compounds include: high reagent cost; and more difficult to handle than peroxide because of fairly large amount of heat generated during mixing peroxide with concentrated sulphuric acid.

Similar to Caro's acid, peracetic acid with sulfuric acid (35%) forms flammable vapor and liquids. So if heating a reaction containing such a mixture, there is a possibility to a have flammable material and strong oxidizer present which would be a major safety concern and could lead to explosions. The use of such reactive material is not welcome in large scale application as the unacceptable risk profile is prohibitive of such. Safety concerns are mostly similar between Caro's acid and peracetic acid (with sulfuric acid) as they are corrosive and strong oxidizers.

In light of the above disclosed conventional methods for the destruction of cyanide-containing compounds used or generated in and around mining operations, there exists a need for a novel composition and method capable of carrying out such method while overcoming at least some of the drawbacks of the prior compositions and/or methods.

SUMMARY OF THE INVENTION

According to a first aspect of the present invention, there is provided a modified Caro's acid which will provide enhanced safety to operators and people handling such when compared to conventional Caro's acid such all the while providing an efficient acid composition. According to a preferred embodiment, the compostions have an increased peroxide stability over conventional Caro's acid.

According to an aspect of the present invention, there is provided a modified aqueous acid composition comprising:
sulfuric acid;
a compound comprising an amine moiety and a sulfonic acid moiety; and
a peroxide;
wherein sulfuric acid, said compound comprising an amine moiety and a sulfonic acid moiety, and said peroxide are present in a molar ratio of no less than 1:1:1.

Preferably, the sulfuric acid and said compound comprising an amine moiety and a sulfonic acid moiety and are present in a molar ratio ranging from 28:1 to 2:1. More preferably, the sulfuric acid and compound comprising an amine moiety and a sulfonic acid moiety are present in a molar ratio ranging from 24:1 to 3:1. Preferably, the sulfuric acid and compound comprising an amine moiety and a sulfonic acid moiety are present in a molar ratio ranging from 20:1 to 4:1. More preferably, the sulfuric acid and compound comprising an amine moiety and a sulfonic acid moiety are present in a molar ratio ranging from 16:1 to 5:1. According to a preferred embodiment of the present invention, the sulfuric acid and compound comprising an amine moiety and a sulfonic acid moiety are present in a molar ratio ranging from 12:1 to 6:1.

The reaction caused by the exposure of cyanide to a modified Caro's acid (MCA) is depicted in equation MCA #1 (below). In the presence of excess hydrogen peroxide, nitrite and carbonate can be formed as per equation MCA #2 (below). Finally, in great excess of hydrogen peroxide, nitrates can be formed as per equation MCA #3 (below).

$$CN^- + H_2O_2 \rightarrow OCN^- + H_2O \tag{MCA \#1}$$

$$OCN^- + 3H_2O_2 \rightarrow NO_2^- + CO_3^{2-} + H_2O + 2H^+ \tag{MCA \#2}$$

$$NO_2^- + H_2O_2 \rightarrow NO_3^- + H_2O \tag{MCA \#3}$$

According to a preferred embodiment, the sulfuric acid, said compound comprising an amine moiety and a sulfonic acid moiety, and said peroxide are present in a molar ratio of no more than 15:1:1.

According to another aspect of the present invention, there is provided a modified acid composition comprising:
sulfuric acid; and
a compound comprising an amine moiety and a sulfonic acid moiety;
wherein sulfuric acid and said compound comprising an amine moiety and a sulfonic acid moiety are present in a molar ratio of no less than 3:1.

Preferably, said compound comprising an amine moiety and a sulfonic acid moiety is selected from the group consisting of: taurine; taurine derivatives; and taurine-related compounds. Preferably also, said taurine derivative or taurine-related compound is selected from the group consisting of: sulfamic acid; taurolidine; taurocholic acid; tauroselcholic acid; tauromustine; 5-taurinomethyluridine and 5-taurinomethyl-2-thiouridine; homotaurine (tramiprosate); acamprosate; and taurates; as well as aminoalkylsulfonic acids where the alkyl is selected from the group consisting of $C_1$-$C_5$ linear alkyl and $C_1$-$C_5$ branched alkyl. Preferably, the linear alkylaminosulfonic acid is selected form the group consisting of: methyl; ethyl (taurine); propyl; and butyl. Preferably, the branched aminoalkylsulfonic acid is selected from the group consisting of: isopropyl; isobutyl; and isopentyl.

Most preferably, said compound comprising an amine moiety and a sulfonic acid moiety is taurine.

According to a preferred embodiment, said sulfuric acid and compound comprising an amine moiety and a sulfonic acid moiety are present in a molar ratio of no less than 3:1.

According to another aspect of the present invention, there is provided an aqueous composition for use in the destruction of cyanide compounds, preferably from cyanide compounds generated from mining operations, wherein said composition comprises:
- sulfuric acid present in an amount ranging from 20 to 80 wt %;
- a compound comprising an amine moiety and a sulfonic acid moiety selected from the group consisting of: taurine; taurine derivatives; and taurine-related compounds; and
- a peroxide.

Preferably, the composition has a pH of less than 1. More preferably, the composition has a pH of less than 0.5.

According to a preferred embodiment of the present invention, there is provided a composition for the destruction of cyanide, wherein said composition comprises:
- sulfuric acid present in an amount ranging from 40 to 80 wt %;
- a compound comprising an amine moiety and a sulfonic acid moiety selected from the group consisting of: taurine and derivatives thereof such as taurine-related compounds;

wherein the sulfuric acid and said amine-containing compound are present in a mole ratio ranging from 3:1 to 15:1.

Preferably, said compound comprising an amine moiety and a sulfonic acid moiety is selected from the group consisting of: taurine; taurine derivatives; and taurine-related compounds. Preferably also, said taurine derivative or taurine-related compound is selected from the group consisting of: sulfamic acid; taurolidine; taurocholic acid; tauroselcholic acid; tauromustine; 5-taurinomethyluridine and 5-taurinomethyl-2-thiouridine; homotaurine (tramiprosate); acamprosate; and taurates; as well as aminoalkylsulfonic acids where the alkyl is selected from the group consisting of $C_1$-$C_5$ linear alkyl and $C_1$-$C_5$ branched alkyl. Preferably, the linear alkylaminosulfonic acid is selected form the group consisting of: methyl; ethyl (taurine); propyl; and butyl. Preferably, the branched aminoalkylsulfonic acid is selected from the group consisting of: isopropyl; isobutyl; and isopentyl. More preferably, said taurine derivative or taurine-related compound is selected from the group consisting of: taurolidine; taurocholic acid; tauroselcholic acid; tauromustine; 5-taurinomethyluridine and 5-taurinomethyl-2-thiouridine; homotaurine (tramiprosate); acamprosate; and taurates.

According to another aspect of the present invention, there is provided an aqueous composition for use in the breaking down of cyanide, wherein said composition comprises:
- sulfuric acid present in an amount ranging from 20 to 80 wt %;
- a compound comprising an amine moiety and a sulfonic acid moiety selected from the group consisting of: taurine; taurine derivatives; and taurine-related compounds; and
- a peroxide;

wherein the sulfuric acid and said amine-containing compound are present in a mole ratio ranging from 3:1 to 15:1. Preferably, said compound comprising an amine moiety and a sulfonic acid moiety is taurine. Preferably, the sulfuric acid is present in an amount ranging from 30 to 70 wt %.

According to a preferred embodiment of the present invention, the peroxide is hydrogen peroxide.

Taurates are used as mild, well-foaming surfactants in body cleansing and personal care products; textile processing such as wetting agents; detergents; and dye dispersants; and, in crop protection formulations as well as other industrial uses.

BRIEF DESCRIPTION OF THE FIGURES

The invention may be more completely understood in consideration of the following description of various embodiments of the invention in connection with the accompanying figures, in which:

FIGS. 2a to 2i are a series of photographs showing a chicken skin exposed to a modified Caro's acid composition which can be used for the methods and processes according to a preferred embodiment of the present invention for a duration of up to 75 minutes.

DESCRIPTION OF THE INVENTION

Figure 1A:
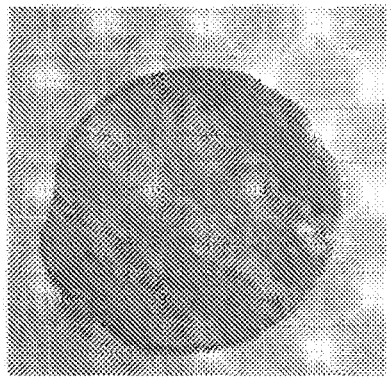
FIGS. 1a to 1h are a series of photographs showing a chicken skin exposed to a conventional Caro's acid composition for a duration of up to 45 minutes.

The experiments carried out using an aqueous acidic composition according to a preferred embodiment of the present invention has shown that a modified Caro's acid can provide effective cyanide destruction all the while providing exceptional safety features previously unheard of with a conventional Caro's acid. Other than safety features, a preferred modified acid according to the present invention provides excellent short term stability of the peroxide component so as to allow shipping of an already mixed Caro's acid to a desired site of use.

Preferably, a composition according to the present invention comprises:
- sulfuric acid; and
- a compound comprising an amine moiety and a sulfonic acid moiety selected from the group consisting of: taurine; taurine derivatives and taurine-related compounds.

Preferably, the taurine derivatives and taurine-related compounds are understood to include: sulfamic acid; taurolidine; taurocholic acid; tauroselcholic acid; tauromustine; 5-taurinomethyluridine and 5-taurinomethyl-2-thiouridine; homotaurine (tramiprosate); acamprosate; and taurates; as well as aminoalkylsulfonic acids where the alkyl is selected from the group consisting of $C_1$-$C_5$ linear alkyl and $C_1$-$C_5$ branched alkyl. Preferably, the linear alkylaminosulfonic acid is selected form the group consisting of: methyl; ethyl (taurine); propyl; and butyl. Preferably, the branched aminoalkylsulfonic acid is selected from the group consisting of: isopropyl; isobutyl; and isopentyl.

According to a preferred embodiment, the taurine derivatives and taurine-related compounds are selected from the group consisting of: taurolidine; taurocholic acid; tauroselcholic acid; tauromustine; 5-taurinomethyluridine and 5-taurinomethyl-2-thiouridine; homotaurine (tramiprosate); acamprosate; and taurates.

Most preferably, the compound comprising an amine moiety and a sulfonic acid moiety is taurine.

According to another aspect of the present invention, there is provided an aqueous acidic composition comprising:
- sulfuric acid; and
- a heterocyclic compound;

wherein sulfuric acid and said heterocyclic compound are present in a molar ratio of no less than 1:1. Preferably, said heterocyclic compound has a molecular weight below 300 g/mol. Also preferably, said heterocyclic compound has a molecular weight below 150 g/mol. More preferably, said heterocyclic compound is a secondary amine. According to a preferred embodiment of the present invention, said heterocyclic compound is selected from the group consisting of: imidazole; triazole; and N-methylimidazole. Preferably, the composition further comprises a peroxide.

According to another aspect of the present invention, there is provided an aqueous acidic composition comprising:
  sulfuric acid; and
  a compound containing an amine group;
wherein sulfuric acid and said compound containing an amine group are present in a molar ratio of no less than 1:1. Also preferably, said compound containing an amine group has a molecular weight below 300 g/mol. Also preferably, said compound containing an amine group has a molecular weight below 150 g/mol. More preferably, said compound containing an amine group is a secondary amine. Even more preferably, said compound containing an amine group is triethanolamine. Preferably, the composition further comprises a peroxide.

According to yet another aspect of the present invention, there is provided an aqueous acidic composition comprising:
  sulfuric acid; and
  an alkanesulfonic acid;
wherein sulfuric acid and said alkanesulfonic acid are present in a molar ratio of no less than 1:1. Preferably, said alkanesulfonic acid is selected from the group consisting of: alkanesulfonic acids where the alkyl groups range from $C_1$-$C_6$ and are linear or branched; and combinations thereof. Preferably, said alkanesulfonic acid is selected from the group consisting of: methanesulfonic acid; ethanesulfonic acid; propanesulfonic acid; 2-propanesulfonic acid; isobutylsulfonic acid; t-butylsulfonic acid; butanesulfonic acid; iso-pentylsulfonic acid; t-pentylsulfonic acid; pentanesulfonic acid; t-butylhexanesulfonic acid; and combinations thereof. More preferably, said alkanesulfonic acid is methanesulfonic acid. Also preferably, said alkanesulfonic acid has a molecular weight below 300 g/mol. Also preferably, said alkanesulfonic acid has a molecular weight below 150 g/mol. Preferably, the composition further comprises a peroxide.

According to yet another aspect of the present invention, there is provided an aqueous acidic composition comprising:
  sulfuric acid; and
  a substituted aromatic compound;
wherein sulfuric acid and said alkanesulfonic acid are present in a molar ratio of no less than 1:1. According to another preferred embodiment of the present invention, the substituted aromatic compound comprises aromatic compound having a sulfonamide substituent, where the compound can be selected from the group consisting of: benzenesulfonamides; toluenesulfonamides; substituted benzenesulfonamides; and substituted toluenesulfonamides. Preferably, the sulfuric acid and said substituted aromatic compound and are present in a molar ratio ranging from 28:1 to 2:1. More preferably, the sulfuric acid and substituted aromatic compound are present in a molar ratio ranging from 24:1 to 3:1. Preferably, the sulfuric acid and substituted aromatic compound are present in a molar ratio ranging from 20:1 to 4:1. More preferably, the sulfuric acid and substituted aromatic compound are present in a molar ratio ranging from 16:1 to 5:1. According to a preferred embodiment of the present invention, the sulfuric acid and substituted aromatic compound are present in a molar ratio ranging from 12:1 to 6:1. Preferably, the composition further comprises a peroxide.

According to another preferred embodiment of the present invention, said substituted aromatic compound is a secondary amine. Even more preferably, said substituted aromatic compound is selected from the group consisting of: sulfanilic acid; metanilic acid; orthanilic acid; and combinations thereof. Even more preferably, said substituted aromatic compound is sulfanilic acid;

According to yet another aspect of the present invention, there is provided an aqueous acidic composition comprising:
  sulfuric acid; and
  an arylsulfonic acid; and
  optionally, a compound comprising an amine group;
wherein sulfuric acid and said arylsulfonic acid are present in a molar ratio of no less than 1:1. Preferably, the sulfuric acid and said arylsulfonic acid are present in a molar ratio ranging from 28:1 to 2:1. Preferably also, said compound comprising an amine group selected from the group consisting of: imidazole; N-methylimidazole; 1-propyl-1H-imidazole; triazole; monoethanolamine; diethanolamine; triethanolamine; pyrrolidine; and combinations thereof. Preferably, the composition further comprises a peroxide.

Preferably, said arylsulfonic acid is selected from the group consisting of: toluenesulfonic acid; benzesulfonic acid; and combinations thereof.

According to yet another aspect of the present invention, there is provided an aqueous acidic composition comprising:
  sulfuric acid; and
  a heterocyclic compound; and
  an alkanesulfonic acid;
wherein sulfuric acid and said heterocyclic compound are present in a molar ratio of no less than 1:1. Also preferably, said heterocyclic compound has a molecular weight below 300 g/mol. Also preferably, said heterocyclic compound has a molecular weight below 150 g/mol. Even more preferably, said heterocyclic compound is selected from the group consisting of: imidazole; triazole; N-alkylimidazole such as, n-methylimidazole; 1-propyl-1H-imidazole; and combinations thereof. Preferably, the composition further comprises a peroxide. Preferably, the alkanesulfonic acid is selected from the group consisting of: alkylsulfonic acids where the alkyl groups range from $C_1$-$C_6$ and are linear or branched; and combinations thereof. Preferably, said alkylsulfonic acid is selected from the group consisting of: methanesulfonic acid; ethanesulfonic acid; propanesulfonic acid; 2-propanesulfonic acid; isobutylsulfonic acid; t-butylsulfonic acid; butanesulfonic acid; iso-pentylsulfonic acid; t-pentylsulfonic acid; pentanesulfonic acid; t-butylhexanesulfonic acid; and combinations thereof. More preferably, said alkylsulfonic acid is methanesulfonic acid. Preferably, the composition further comprises a peroxide.

According to yet another aspect of the present invention, there is provided an aqueous acidic composition comprising:
  sulfuric acid; and
  a carbonyl-containing nitrogenous base compound; and
wherein sulfuric acid and said carbonyl-containing nitrogenous base compound are present in a molar ratio of no less than 1:1. Also preferably, said carbonyl-containing nitrogenous base compound has a molecular weight below 300 g/mol. Also preferably, said carbonyl-containing nitrogenous base compound has a molecular weight below 200 g/mol. More preferably, said carbonyl-containing nitrogenous base compound is selected from the group consisting of: caffeine; creatine; creatinine; and similar compounds. Preferably, the composition further comprises a peroxide. According to a preferred embodiment of the present invention, the carbonyl-containing nitrogenous base compound is an amino acid. Preferably, the amino acid is selected from the group consisting of: glycine, arginine and histidine and other amino acids capable of achieving a stable composition when placed in a composition along with sulfuric acid and a peroxide (such as, but not limited to hydrogen peroxide).

The person skilled in the art will understand that the term 'stability' or 'stable' when associated with a composition comprising sulfuric acid, a peroxide and a carbonyl-containing nitrogenous base compound means that the composition does not readily degrade upon the addition of the arylsulfonic acid compound to a mixture comprising sulfuric acid and a peroxide. Preferably, the term stable or stability when associated with such a preferred composition means that the composition will retain a substantial part of its acidic character without degrading for a period of at least 24 hours. More preferably, the term stable or stability when associated with such a preferred composition means that the composition will retain a substantial part of its acidic character without degrading for a period of at least 48 hours. Even more preferably, the term stable or stability when associated with such a preferred composition means that the composition will retain a substantial part of its acidic character without degrading for a period of at least 72 hours. Tests were conducted to assess the stability of several amino acids in solution with sulfuric acid and revealed that the following showed less than desirable stability in the presence of sulfuric acid: lysine; threonine; tryptophan; and methionine.

According to another preferred embodiment of the present invention, the carbonyl-containing nitrogenous base compound is selected from the group consisting of: methylpyrrolidine; N,N-dimethylacetamide and acetamide.

According to an aspect of the present invention, there is process for the destruction of cyanide in waste water containing such, said process comprising the steps of:
  providing said waste water;
  exposing said requiring to a composition comprising:
    sulfuric acid present in an amount ranging from 20 to 80 wt %;
    a modifying agent compound comprising an amine moiety and a sulfonic acid moiety selected from the group consisting of: taurine; taurine derivatives; and taurine-related compounds; and
    a peroxide;
for a period of time sufficient to degrade at least 80% of said cyanide present into less toxic compounds. Preferably, said period of time is sufficient to degrade at least 90% of said cyanide present into less toxic compounds. More preferably, said period of time is sufficient to degrade at least 95% of said cyanide present into less toxic compounds.

According to another preferred embodiment of the present invention, the process is carried out under atmospheric pressure. Preferably, said process is carried out under ambient temperature.

According to another preferred embodiment of the present invention, the waste water is a result of heap leaching or vat leaching.

Example #1

A composition according to a preferred embodiment of the present invention was prepared by dissolving 1 molar equivalent of taurine into sulfuric acid and subsequently adding hydrogen peroxide. The final composition comprised sulfuric acid:taurine:hydrogen peroxide in a 5.0:1.7:1.0 molar ratio. Preferably, the resulting pH of the composition is less than 1. More preferably, the resulting pH of the composition is less than 0.5.

According to a preferred embodiment of the present invention, the composition provides a peroxide yield of above 25% after 7 days of mixing such composition. More preferably, the peroxide percent yield is above 35% after 2 weeks upon mixing said composition.

Skin Corrosiveness Testing

To assess the immediate corrosiveness of a composition according to a preferred embodiment of the present invention, a visual comparative assessment was carried out using chicken skin. Two chicken skin samples were secured over the opening of two beakers. The first skin sample was exposed to a solution of sulfuric acid ($H_2SO_4$) and hydrogen peroxide ($H_2O_2$). The second skin sample was exposed to a composition according to a preferred embodiment of the present invention, namely sulfuric acid; taurine; and hydrogen peroxide ($H_2O_2$) (in a 5.0:1.7:1.0 molar ratio).

Figure 1B:
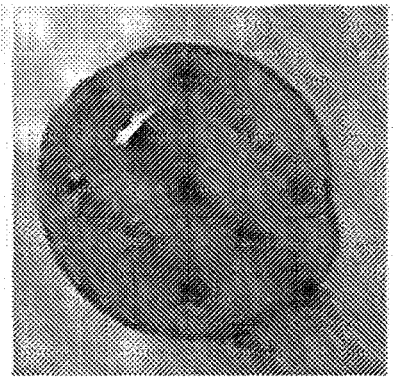
Figure 1C:
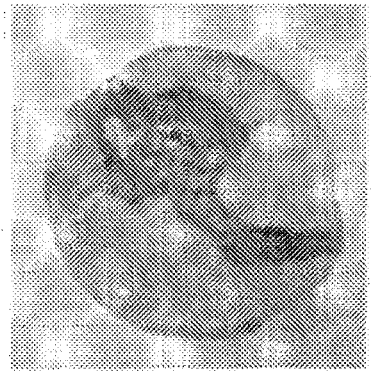
Figure 1D:
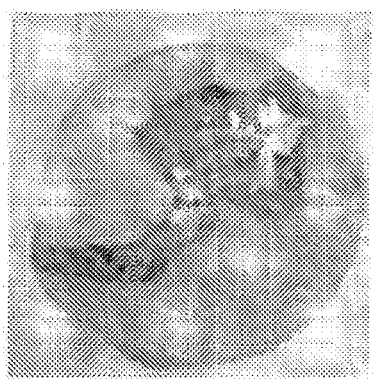
Figure 1E:
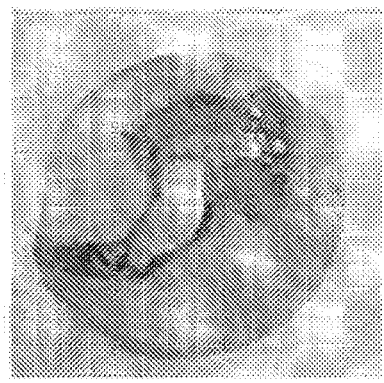
Figure 1F:
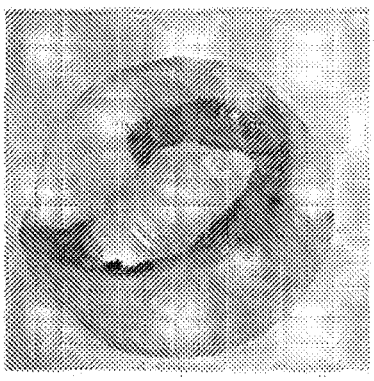
Figure 1G:
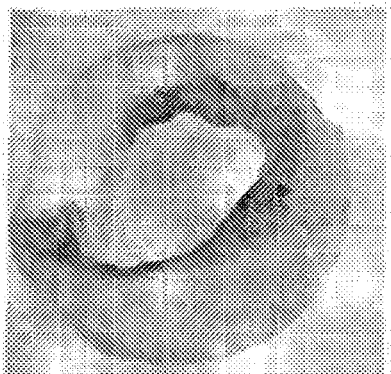
Figure 1H:
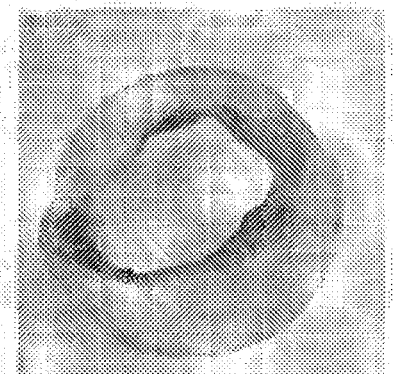

FIG. 1a-h (showing the skin treated with the standard $H_2SO_4$—$H_2O_2$ solution) shows the results of the corrosiveness at times of 0, 4, 6, 10, 15, 30 and 45 minutes. FIG. 2a-i (showing the skin treated with a $H_2SO_4$-taurine-$H_2O_2$ composition as described above) shows the results of the corrosiveness at times of 0, 5, 10, 15, 30, 45, 60 and 75 minutes. This dermal corrosiveness test comparison between conventional Caro's Acid and a modified Caro's Acid (in a 3:1 sulfuric acid:taurine molar ratio) highlights the safety advantage of the composition according to a preferred embodiment of the present invention. The sulfuric acid concentrations in Caro's acid and modified Caro's acid are approximately 80 wt % and 60 wt % respectively, whereas the hydrogen peroxide concentration was equivalent.

The conventional Caro's acid leads to a breakthrough after ca. 5.5 min. The modified Caro's Acid according to the preferred embodiment described and tested breaks through the skin sample after approximately 45 minutes, but the degree of breakthrough is much smaller compared to the conventional Caro's acid. Despite the fact that this is not an OECD recognized official test, this test clearly highlights the advantages that a person, accidentally exposed to the modified Caro's acid according to an embodiment of the present invention, has significantly more time available to find a safety shower to minimize irreversible skin damage and further injuries.

Titration of Caro's Acid and a Preferred Composition of the Present Invention

The inventors have titrated both Caro's acid (5.57:1 molar ratio of $H_2SO_4$:$H_2O_2$) and a modified Caro's acid (5.0:1.7:1.0 molar ratio of $H_2SO_4$:Taurine:$H_2O_2$) both of which were synthesized using an ice bath and constant stirring. The compositions are stored capped, but not sealed in a water bath at a constant temperature of 30° C.

To determine the concentration of $H_2O_2$, the solutions were titrated against a standardized $KMnO_4$ solution. The titration procedure follows:
1. A solution with approximately 245 mL of $dH_2O$ and 5 mL of 96% $H_2SO_4$ is prepared
2. Approximately 1 g of Caro's acid/modified Caro's acid is measured by an analytical balance and recorded
3. The diluted $H_2SO_4$ solution is used to quantitatively transfer the measured Caro's acid/modified Caro's acid into a 300 mL Erlenmeyer flask
4. The solution is mixed constantly with a magnetic stir plate/stir bar during the titration
5. The solution is titrated using the standardized $KMnO_4$ solution until the appearance of a persistent pink color for at least 1 minute.

The moles of $H_2O_2$ found in the titrated sample and the moles of $H_2O_2$ used in the synthesis are used to calculate the percent yield.

TABLE 2

Titration results of Caro's Acid and a preferred composition of the present invention

|  | Caro's acid Percent yield of $H_2O_2$ | Modified Caro's acid Percent yield of $H_2O_2$ |
|---|---|---|
| as synthesised | 16.2 | 38.9 |
| 2 days | 18.1 | 40.0 |
| 5 days | 16.6 | 47.9 |
| 7 days | 15.5 | 54.9 |
| 12 days | 7.7 | 52.7 |
| 27 days | 0.0 | 42.6 |

The comparison between Caro's acid and the modified Caro's acid show that the modified Caro's acid has significantly more active $H_2O_2$ after the synthesis, and retains the activity for an extended period of time (at least 27 days); resulting in a product that has a significantly longer shelf life, increasing operational efficiency and minimizing the waste resulting from expired product.

Effect of Caro's Acid on pH

Typically, when used in treating mine waste water, the amount of pH drop when adding Caro's acid will vary with the type of ore, amount of lime used in the cyanidation step, the initial and final WAD $CN^-$ concentrations and the ratio of Caro's acid (CA)/$CN^-$. A concern with reducing the pH however, is the possible release of hydrogen cyanide (HCN) into the atmosphere creating a health hazard. When encountering minimal HCN levels this is believed to be as a result of the very rapid reaction of Caro's acid with $CN^-$ and the mixing and flow patterns of the slurries being treated.

Since process conditions e.g. recycling of low pH pond water into a $CN^-$ reclaim water tank may result in HCN release, extra lime or other alkali should be available to raise the pH should it be needed. As a further precaution, periodic HCN measurements should always be made in confined areas surrounding the detoxification process. It is believed that a preferred embodiment of the present invention, a modified Caro's acid can overcome, at least in part, the process of excessive reaction speed which results in a rapid pH drop and consequently the generation of HCN.

Cyanide Destruction Experiment

A preferred composition according to the present invention was used to carry out cyanide destruction experiments in order to assess its potential application onto mining waste water contaminated with cyanide. The extent of the cyanide destruction reaction was assessed by titration of the remaining free cyanide by silver nitrate.

A solution of 100 mL reverse osmosis water was added to a 125 mL Erlenmeyer flask. To the Erlenmeyer flask, 0.2000 mL of 1000 mg/L KCN was added. The system was then treated with 1 mL of $H_2SO_4$:$H_2O_2$:Taurine blend in a 10:10:1 molar ratio blend to react with free cyanide. The experiment was of a duration of 30 min.

The resulting solution was then titrated with a solution of silver nitrate (50 mg/L $AgNO_3$ (prepared by dilution)). Before titration with silver nitrate, approximately 5 drops of 1M KI (potassium iodide) was added to make the observation of a visual end-point easier. The end-point is defined as the first sign of a permanent pale-yellow turbidity, which can also be defined of the removal of opalescence from solution.

Results

The starting solution contained $2.01 \times 10^{-4}$ mols of KCN (free cyanide), after treatment with a molar ratio of 10:10:1 $H_2SO_4$:$H_2O_2$:Taurine blend for 30 minutes the concentration of free cyanide in the solution was reduced to $1.12 \pm 0.04 \times 10^{-6}$ mols. This represents a cyanide destruction of approximately 99.44% of the initial free cyanide content.

In light of the results, it is expected that such a system could be applied on large volumes of cyanide-containing waste water. Because of the safety aspect of preferred compositions according to the present invention, and the large volumes of cyanide-contaminated waste water generated by mining operations, the application of preferred compositions of the present invention could result in substantial improvements in the water around mining operations. Moreover, because of the stability of said preferred compositions, the compositions could be prepared off site and transported to the site requiring water treatment where the safety of operators involved in the actual water treatment operations or in the transport of the chemicals would not be compromised.

While the foregoing invention has been described in some detail for purposes of clarity and understanding, it will be appreciated by those skilled in the relevant arts, once they have been made familiar with this disclosure that various changes in form and detail can be made without departing from the true scope of the invention in the appended claims.

The invention claimed is:

1. A method for the destruction of cyanide present in waste water, said method comprising:
   providing said waste water;
   exposing said waste water to a composition comprising:
      sulfuric acid present in an amount ranging from 20 to 80 wt % of said composition;
      a compound comprising an amine moiety and a sulfonic acid moiety selected from the group consisting of taurine and taurine derivatives; and
      a peroxide;
   for a period of time sufficient to degrade at least 80% of said cyanide present into non-cyanide containing compounds;
      wherein said taurine derivatives are selected from the group consisting of: taurolidine; taurocholic acid; tauroselcholic acid; tauromustine; 5-taurinomethyluridine; 5-taurinomethyl-2-thiouridine; homotaurine (tramiprosate); acamprosate; taurates; and aminoalkylsulfonic acids where the alkyl is selected from the group consisting of $C_1$-$C_5$ linear alkyl and $C_1$-$C_5$ branched alkyl.

2. The method according to claim 1, where said compound comprising an amine moiety and a sulfonic acid moiety is taurine.

3. The method according to claim 1, where said sulfuric acid and said compound comprising an amine moiety and a sulfonic acid moiety are present in a molar ratio of no less than 3:1.

4. The method according to claim 1, where the peroxide is hydrogen peroxide.

5. The method according to claim 1, where said period of time is sufficient to degrade at least 90% of said cyanide present into non-cyanide containing compounds.

6. The method according to claim 1, where said method is carried out under atmospheric pressure.

7. The method according to claim 1, where said method is carried out under ambient temperature.

8. The method according to claim 1, wherein the waste water is a result of heap leaching or vat leaching.

* * * * *